(12) United States Patent
Fujimaki et al.

(10) Patent No.: US 11,630,793 B2
(45) Date of Patent: Apr. 18, 2023

(54) IMAGE DISPLAY DEVICE AND PORT ARRANGEMENT

(71) Applicant: SEIKO EPSON CORPORATION, Tokyo (JP)

(72) Inventors: Yutaka Fujimaki, Matsumoto (JP); Shoichi Yokoyama, Tokyo-to (JP)

(73) Assignee: SEIKO EPSON CORPORATION, Tokyo (JP)

( * ) Notice: Subject to any disclaimer, the term of this patent is extended or adjusted under 35 U.S.C. 154(b) by 49 days.

(21) Appl. No.: 17/133,685

(22) Filed: Dec. 24, 2020

(65) Prior Publication Data

US 2021/0200708 A1    Jul. 1, 2021

(30) Foreign Application Priority Data

Dec. 26, 2019   (JP) .............................. JP2019-235891

(51) Int. Cl.
*G06F 13/40*   (2006.01)
*G06F 1/16*    (2006.01)
*G06F 3/14*    (2006.01)
*H04N 23/57*   (2023.01)

(52) U.S. Cl.
CPC ........ *G06F 13/4068* (2013.01); *G06F 1/1607* (2013.01); *G06F 3/14* (2013.01); *H04N 23/57* (2023.01)

(58) Field of Classification Search
CPC ...................................................... G06F 1/163
See application file for complete search history.

(56) References Cited

U.S. PATENT DOCUMENTS

| | | | | |
|---|---|---|---|---|
| 5,003,300 A | * | 3/1991 | Wells | H04N 3/08 340/980 |
| 2010/0306565 A1 | | 12/2010 | Umedu | |
| 2015/0024691 A1 | * | 1/2015 | Choi | H04W 4/80 455/41.3 |
| 2016/0104451 A1 | * | 4/2016 | Sahin | G09G 3/002 345/519 |
| 2019/0115752 A1 | * | 4/2019 | Saunders | H02J 1/06 |

FOREIGN PATENT DOCUMENTS

JP    2011034601    2/2011

* cited by examiner

*Primary Examiner* — Henry Tsai
*Assistant Examiner* — Juanito C Borromeo
(74) *Attorney, Agent, or Firm* — JCIPRNET

(57) ABSTRACT

A control device including a USB port of a first interface capable of transmitting an image signal serving as a basis of an image to be displayed by the control device and capable of receiving power, and a port of a second interface capable of receiving power, is provided. The control device is accommodated in a housing, the USB port is disposed at a bottom surface which, given a surface of the housing where the touch panel is disposed as a front surface, is a side surface positioned in a longitudinal direction of the front surface, and the port is disposed at a rear surface opposite the front surface.

10 Claims, 15 Drawing Sheets

IMAGE DISPLAY DEVICE AND PORT ARRANGEMENT

The present application is based on, and claims priority from JP Application Serial Number 2019-235891, filed Dec. 26, 2019, the disclosure of which is hereby incorporated by reference herein in its entirety.

BACKGROUND

1. Technical Field

The present disclosure relates to an image display device and a port arrangement.

2. Related Art

In recent years, data communication buses such as a universal serial bus (USB) are increasingly used for data communication as well as for power supply and reception. JP-A-2011-34601 discloses an information processing device configured to supply power appropriate for a device to be powered.

Assume a case in which a plurality of ports are provided to an image display device, a plurality of external devices are coupled to the image display device, and data communication and power supply and reception are performed with the plurality of external devices. In this case, depending on an arrangement of the ports, a usability of the image display device may be impaired.

SUMMARY

One aspect for solving the problems described above is an image display device configured to display an image on a display surface, the image display device including a first port of a first interface configured to transmit an image signal that serves as a basis of an image and receive power, and a second port of a second interface configured to receive power. The image display device is accommodated in a housing, the first port is disposed at a side surface of a first surface of the housing provided with the display surface, the side surface being positioned in a longitudinal direction of the first surface, and the second port is disposed at an end portion of a second surface that is opposite to the first surface, the end portion being in a longitudinal direction of the second surface.

Another aspect for solving the problems described above is a port arrangement in which a first port of a first interface configured to transmit an image signal and configured to receive power is disposed at a second surface that is a side surface of a first surface of a housing accommodating a device main body and that is positioned in a longitudinal direction of the first surface, and a second port of a second interface configured to receive power is disposed at an end portion of a third surface that is opposite to the first surface, the end portion being in the longitudinal direction of the third surface.

DESCRIPTION OF EXEMPLARY EMBODIMENTS

1. Configuration of Display System

Exemplary embodiments with the present disclosure applied thereto are described below with reference to the accompanying drawings.

Figure 1:
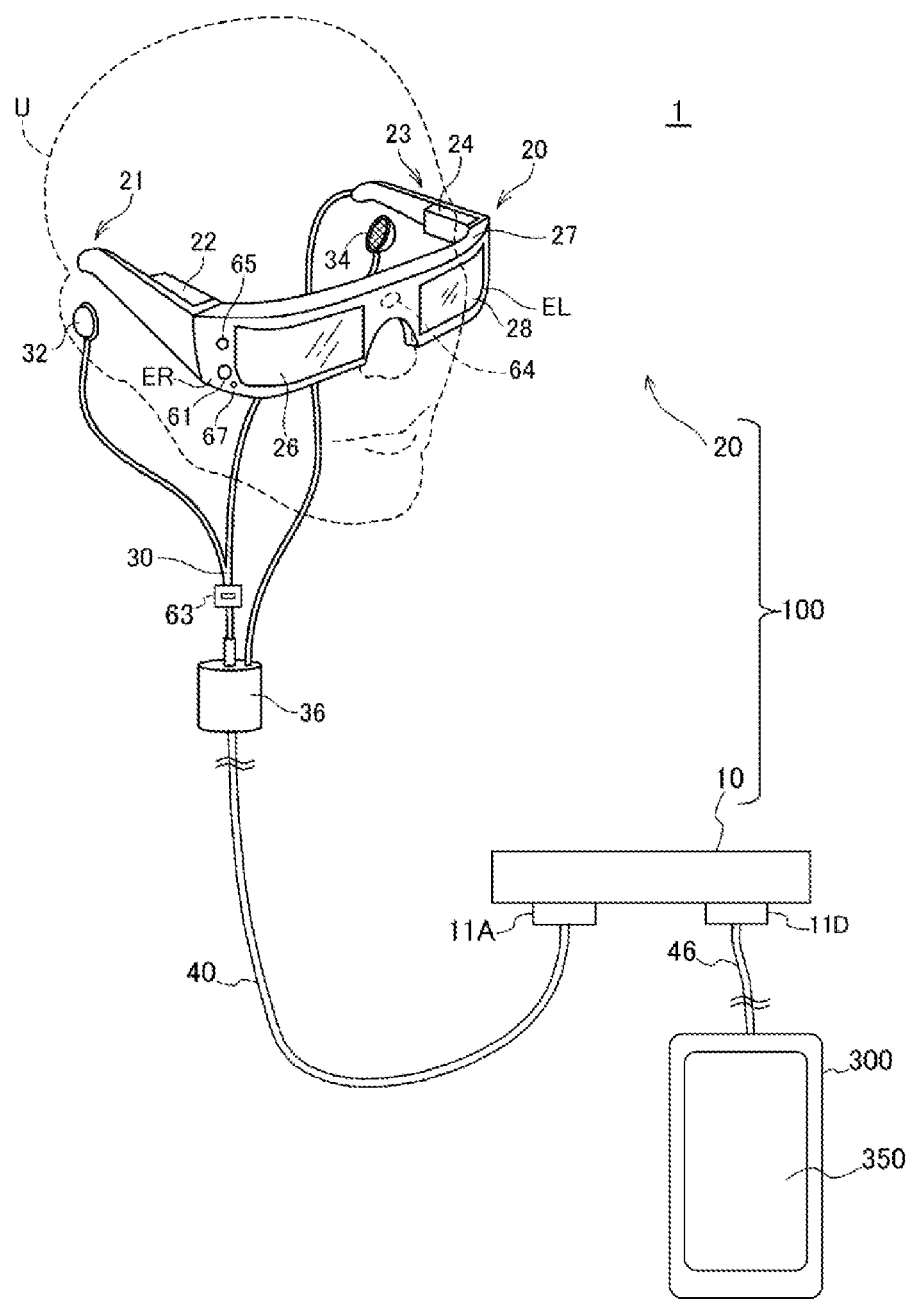
FIG. 1 is a drawing illustrating an overall configuration of a display system.

FIG. 1 is a drawing illustrating an overall configuration of a display system 1.

The display system 1 includes an HMD 100 and a control device 300. The HMD 100 is a head-mounted display apparatus including an image display unit 20 mounted on a head of a user U, and causes the user to visually recognize images and video. HMD is an abbreviated expression for head-mounted display.

The HMD 100 includes a connection device 10 coupled to the image display unit 20. The connection device 10 functions as an interface coupling the HMD 100 to a device different from the HMD 100. In the display system 1, the control device 300 is coupled to the connection device 10.

In the following descriptions and drawings, for the sake of convenience of description, the names of several functional components constituting the HMD 100 are denoted by a prefix DP, and the names of several functional components constituting the control device 300 are denoted by the prefix CO.

The control device 300 includes a display screen that displays characters and images, and a touch panel 350 that functions as an operation unit that detects touch operations and pressing operations, and is a terminal device having a portable size, allowing use of a smart phone, for example. The touch panel 350 is constituted by an LCD 331 and a touch sensor 336 described later with reference to FIG. 4. LCD is an abbreviated expression for liquid crystal display. The touch panel 350 corresponds to an example of a display surface of the present disclosure, and the control device 300 corresponds to an example of an image display device of the present disclosure. The control device 300 may be a desktop personal computer, a notebook personal computer, a tablet personal computer, or the like.

The connection device 10 includes a connector 11A and a connector 11D in a box-shaped case. The image display unit 20 is coupled to the connector 11A via a connection cable 40, and the control device 300 is coupled to the connector 11D via a USB cable 46. Thus, the image display unit 20 and the control device 300 are coupled in a way that allows data to be transmitted and received between the two. For example, the control device 300 outputs image data for the image display unit 20 to display an image, and sound data to the image display unit 20. For example, the image display unit 20 transmits detected data of various sensors included in the image display unit 20 to the control device 300 as described later. The control device 300 may be capable of supplying power to the image display unit 20. USB is an abbreviated expression for universal serial bus.

The configuration in which the connection device 10 and the control device 300 are coupled using the USB cable 46 is merely an example, and the specific coupling form of the connection device 10 and the control device 300 is not limited. For example, other types of cables may be used to couple the devices in a wired manner or the devices may be coupled in a wireless manner. For example, in a configuration in which the USB cable 46 is coupled to the connector 11D of a USB Type-C standard, a 20-volt direct current can be supplied by the USB cable 46, and image data of an HDMI standard or the like can be transmitted as a function of an alternate mode of the USB Type-C. HDMI and MHL are each a trade name.

The image display unit 20 includes a main body including a right holding portion 21, a left holding portion 23, and a front frame 27. The main body further includes a right display unit 22, a left display unit 24, a right light-guiding plate 26, and a left light-guiding plate 28.

The right holding portion 21 and the left holding portion 23 extend rearward from corresponding end portions of the front frame 27 and hold the image display unit 20 on the head of the user U. The right holding portion 21 is coupled to an end portion ER positioned on a right side of the user U in the front frame 27, and the left holding portion 23 is coupled to an end portion EL positioned on a left side of the user U.

The right light-guiding plate 26 and the left light-guiding plate 28 are provided to the front frame 27. The right light-guiding plate 26 is positioned in front of a right eye of the user U in a state in which the user U is wearing the image display unit 20, and causes the user U to visually recognize an image with the right eye. The left light-guiding plate 28 is positioned in front of a left eye of the user U in a state in which the user U is wearing the image display unit 20, and causes the user U to visually recognize an image with the left eye. The right light-guiding plate 26 and the left light-guiding plate 28 are optical portions formed of a light-transmissive resin or the like, and are configured to guide imaging light output by the right display unit 22 and the left display unit 24 to the eyes of the user U. The right light-guiding plate 26 and the left light-guiding plate 28 are, for example, prisms.

The front frame 27 has a shape formed by coupling an end of the right light-guiding plate 26 and an end of the left light-guiding plate 28 to each other, and this coupling position corresponds to a position between eyebrows of the user U in a state in which the user is wearing the image display unit 20. The front frame 27 may include a nose pad that comes into contact with a nose of the user U in a state in which the user U is wearing the image display unit 20, and may have a configuration in which a belt is coupled to the right holding portion 21 and the left holding portion 23 and the image display unit 20 is held to the head of the user U by the belt.

Each of the right display unit 22 and the left display unit 24 is a module obtained by unitizing an optical unit and a peripheral circuit. The right display unit 22 displays an image by the right light-guiding plate 26, and the left display unit 24 displays an image by the left light-guiding plate 28. The right display unit 22 is provided to the right holding portion 21 and the left display unit 24 is provided to the left holding portion 23.

The imaging light guided by the right light-guiding plate 26 and outside light transmitted through the right light-guiding plate 26 are incident on the right eye of the user U. Similarly, the imaging light guided by the left light-guiding plate 28 and the outside light transmitted through the left light-guiding plate 28 are incident on the left eye. The imaging light from the right light-guiding plate 26 and the left light-guiding plate 28 and the outside light passing through the right light-guiding plate 26 and the left light-guiding plate 28 are incident on the eyes of the user U. Thus, the user U visually recognizes an image displayed by the image display unit 20 and an outside scene transmitted through the right light-guiding plate 26 and the left light-guiding plate 28.

A DP illuminance sensor 65 is disposed on the front frame 27. The DP illuminance sensor 65 is a sensor configured to receive outside light from in front of the user U wearing the image display unit 20. The DP illuminance sensor 65 can detect an illuminance and an amount of outside light transmitted through the right light-guiding plate 26 and the left light-guiding plate 28 and incident on the eye of the user U.

A DP outer camera 61 is provided to a position of the front frame 27 where the DP outer camera 61 does not block the outside light transmitted through the right light-guiding plate 26 and the left light-guiding plate 28. The DP outer camera 61 is a digital camera including an imaging element such as a CCD or a CMOS, an imaging lens, and the like, and may be a monocular camera or a stereo camera. An angle of view of the DP outer camera 61 includes at least a portion of the range of the outside scene transmitted through the right light-guiding plate 26 and the left light-guiding plate 28 and visually recognized by the user U wearing the image display unit 20. The DP outer camera 61 may be a wide angle camera and may be capable of capturing the entire outside scene visually recognized by the user U wearing the image display unit 20. CCD is an abbreviation for charge coupled device, and CMOS is an abbreviation for complementary metal oxide semiconductor.

A light-emitting diode (LED) indicator 67 that lights during operation of the DP outer camera 61 is disposed on the front frame 27.

The front frame 27 is provided with a distance sensor 64 that detects a distance to a measurement target object positioned in a measurement direction set in advance. The distance sensor 64 is, for example, a light reflective distance sensor that uses an LED, a laser diode, or the like, an infrared depth sensor, an ultrasonic distance sensor, or a laser range scanner. The distance sensor 64 may be a distance detection unit that combines image detection and sound detection, or a device that processes an image obtained by stereo imaging by a camera to detect the distance. The measurement direction of the distance sensor 64 is, for example, the direction of the outside scene transmitted through the right light-guiding plate 26 and the left light-guiding plate 28 and visually recognized by the user U.

Each of the right display unit 22 and the left display unit 24 is coupled to the connection device 10 by the connection cable 40. The connection cable 40 includes an audio connector 36. A headset 30 including a right earphone 32 and a left earphone 34 constituting a stereo headphone, and a microphone 63 is coupled to the audio connector 36. The right earphone 32 and the left earphone 34 output a sound on the basis of a sound signal output from the connection device 10. The microphone 63 collects a sound and outputs the sound signal to the connection device 10.

2. Configuration of Optical System of Image Display Unit

Figure 2:
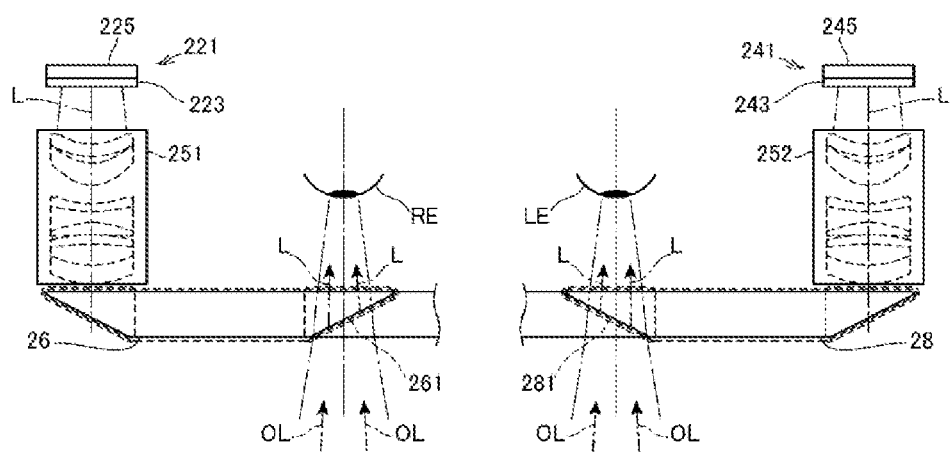
FIG. 2 is a main component plan view illustrating a configuration of an optical system of an image display unit.

FIG. 2 is a main component plan view illustrating a configuration of an optical system of the image display unit 20. In FIG. 2, a left eye LE and a right eye RE of the user U are illustrated for explanation.

The right display unit 22 and the left display unit 24 are configured to be left-right symmetrical, for example.

As a configuration that causes the right eye RE to visually recognize an image, the right display unit 22 includes an OLED unit 221 configured to emit imaging light, and a right optical system 251 configured to guide an imaging light L emitted by the OLED unit 221 to the right light-guiding plate 26. OLED is an abbreviation for organic light-emitting diode.

Figure 3:
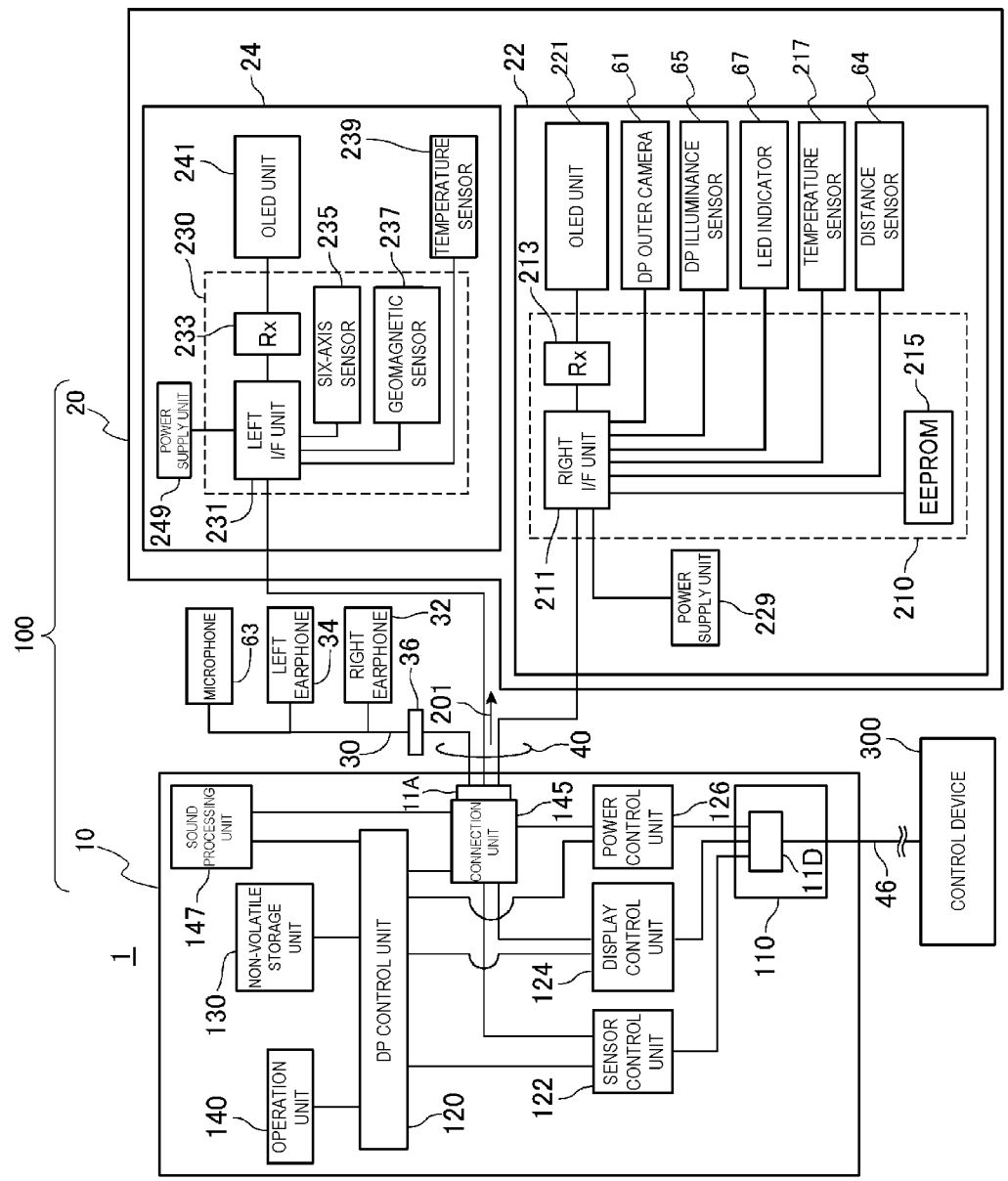
FIG. 3 is a block diagram of the display system.

The OLED unit 221 includes an OLED panel 223 and an OLED driving circuit 225 configured to drive the OLED panel 223. The OLED panel 223 is a self-light emission type display panel including light-emitting elements configured to respectively emit color lights of red (R), green (G), and blue (B), for example. The OLED driving circuit 225 drives the OLED panel 223 in accordance with a control of a DP control unit 120. The OLED driving circuit 225 is mounted onto a substrate (not illustrated) fixed to a rear surface of the OLED panel 223, for example, and a temperature sensor 217 illustrated in FIG. 3 is mounted onto this substrate.

The right optical system 251 converts the imaging light L emitted from the OLED panel 223 into a luminous flux in a parallel state by a collimator lens and causes the imaging light L to be incident on the right light-guiding plate 26. The imaging light L is reflected by a plurality of reflection surfaces in an interior of the right light-guiding plate 26, reflected by a half mirror 261 positioned in front of the right eye RE, and emitted from the right light-guiding plate 26 toward the right eye RE.

As a configuration that causes the left eye LE to visually recognize an image, the left display unit 24 includes an OLED unit 241 configured to emit imaging light, and a left optical system 252 configured to guide the imaging light L emitted by the OLED unit 241 to the left light-guiding plate 28.

The OLED unit 241 includes an OLED panel 243, and an OLED driving circuit 245 configured to drive the OLED panel 243. The OLED panel 243 is a self-light emission type display panel including light-emitting elements configured to respectively emit color lights of red (R), green (G), and blue (B), for example. The OLED driving circuit 245 drives the OLED panel 243 in accordance with the control of the DP control unit 120. The OLED driving circuit 245 is mounted onto a substrate (not illustrated) fixed to a rear surface of the OLED panel 243, for example, and a temperature sensor 239 illustrated in FIG. 3 is mounted onto this substrate.

The left optical system 252 converts the imaging light L emitted from the OLED panel 243 into a luminous flux in a parallel state by a collimator lens and causes the imaging light L to be incident on the left light-guiding plate 28. The imaging light L is reflected by a plurality of reflection surfaces in an interior of the left light-guiding plate 28, reflected by the half mirror 281 positioned in front of the left eye LE, and emitted from the left light-guiding plate 28 toward the left eye LE.

The HMD 100 functions as a transmissive display device. That is, the imaging light L reflected by the half mirror 261 and outside light OL transmitted through the right light-guiding plate 26 are incident on the right eye RE of the user U. Additionally, the imaging light L reflected by the half mirror 281 and the outside light OL transmitted through the half mirror 281 are incident on the left eye LE. In this manner, the HMD 100 causes the imaging light L of the internally processed image and the outside light OL to be incident on the eyes of the user U in an overlapped manner. This allows the user U to see an outside scene through the right light-guiding plate 26 and the left light-guiding plate 28, enabling the image by the imaging light L to be visually recognized in a manner overlapped with the outside scene. Each of the half mirrors 261, 281 is an image extracting unit configured to reflect the imaging light output by each of the right display unit 22 and the left display unit 24 and extract an image, and constitutes a display unit.

3. Control System of HMD

FIG. 3 is a block diagram of the display system 1, illustrating in particular the configuration of the HMD 100 in detail.

In the image display unit 20, the right display unit 22 includes a right display unit substrate 210. A right interface (I/F) unit 211 coupled to the connection cable 40, a reception unit 213 configured to receive data input from the connection device 10 via the right I/F unit 211, and an EEPROM 215 are mounted onto the right display unit substrate 210. The right I/F unit 211 couples the reception unit 213, the EEPROM 215, the temperature sensor 217, the DP outer camera 61, the distance sensor 64, the DP illuminance sensor 65, and the LED indicator 67 to the connection device 10. The reception unit 213 couples the OLED unit 221 to the connection device 10.

The left display unit 24 includes a left display unit substrate 230. A left I/F unit 231 coupled to the connection cable 40, and a reception unit 233 configured to receive data input from the connection device 10 via the left I/F unit 231 are mounted onto the left display unit substrate 230. A DP six-axis sensor 235 and a DP magnetic sensor 237 are mounted onto the left display unit substrate 230.

The left I/F unit 231 couples the reception unit 233, the DP six-axis sensor 235, the DP magnetic sensor 237, and the temperature sensor 239 to the connection device 10. The reception unit 233 couples the OLED unit 241 to the connection device 10.

In the descriptions and the drawings of this exemplary embodiment, EEPROM is an abbreviation for electrically erasable programmable read-only memory. The reception unit 213 and the reception unit 233 may be denoted as Rx 213 and Rx 233, respectively.

The EEPROM 215 is configured to store various types of data in a non-volatile manner. The EEPROM 215 stores, for example, data related to light-emitting properties and display properties of the OLED units 221, 241 provided to the image display unit 20, data related to a property of a sensor provided to the right display unit 22 or the left display unit 24, and the like. Specifically, the EEPROM 215 stores parameters regarding gamma correction of the OLED units 221, 241, data used to compensate for detection values of the temperature sensors 217, 239, and the like in a manner readable by the DP control unit 120.

The DP outer camera 61 captures an image in accordance with a signal input via the right I/F unit 211 and outputs imaging data to the right I/F unit 211. The illuminance sensor 65 receives the outside light and outputs a detected value corresponding to an amount of the received light or an intensity of the received light. The LED indicator 67 is configured to light in accordance with a control signal or a driving current input via the right I/F unit 211.

The temperature sensor 217 detects a temperature of the OLED unit 221, and outputs a voltage value or a resistance value corresponding to the detected temperature as a detected value.

The distance sensor 64 outputs a signal indicating a detection result of detecting a distance to the connection device 10 via the right I/F unit 211.

The reception unit 213 receives image data for display transmitted from the connection device 10 via the right I/F unit 211, and outputs the image data to the OLED unit 221. The OLED unit 221 displays an image based on the image data transmitted by the connection device 10.

The reception unit 233 receives image data for display transmitted from the connection device 10 via the left I/F unit 211, and outputs the image data to the OLED unit 241. The OLED units 221, 241 display an image based on the image data transmitted by the connection device 10.

The DP six-axis sensor 235 is a motion sensor including a three-axis acceleration sensor and a three-axis gyro sensor. The DP magnetic sensor 237 is a three-axis geomagnetic sensor, for example. The DP six-axis sensor 235 and the DP magnetic sensor 237 may be IMUs in which each of the sensors described above is modularized, or may be a module in which the DP six-axis sensor 235 and the DP magnetic sensor 237 are integrated. IMU is an abbreviation for inertial measurement unit. The temperature sensor 239 detects the temperature of the OLED unit 241. The DP six-axis sensor 235, the DP magnetic sensor 237, and the temperature sensor 239 each output a detected value to the connection device 10.

Each component of the image display unit 20 operates with power supplied from the connection device 10 via the connection cable 40. The image display unit 20 includes a power supply unit 229 in the right display unit 22, and a power supply unit 249 in the left display unit 24. The power supply unit 229 distributes and supplies the power supplied by the connection device 10 via the connection cable 40 to each component of the right display unit 22 including the right display unit substrate 210. Similarly, the power supply unit 249 distributes and supplies the power supplied by the connection device 10 via the connection cable 40 to each component of the left display unit 24 including the left display unit substrate 230. The power supply units 229, 249 may include a conversion circuit or the like configured to convert a voltage.

The connection device 10 includes an I/F unit 110, the DP control unit 120, a sensor control unit 122, a display control unit 124, a power control unit 126, a non-volatile storage unit 130, an operation unit 140, a connection unit 145, and a sound processing unit 147.

The I/F unit 110 includes the connector 11D and an interface circuit configured to execute communication protocols conforming to respective communication standards by the connector 11D. The I/F unit 110 is, for example, an interface substrate on which the connector 11D and the interface circuit are mounted. The I/F unit 110 may include an interface for a memory card capable of being coupled to an external storage device or storage medium, or the like, or the I/F unit 110 may be constituted by a wireless communication interface.

The DP control unit 120 includes a processor such as a central processing unit (CPU) or a microcomputer, and this processor is configured to execute a program, thereby controlling each component of the connection device 10. The DP control unit 120 may include a RAM constituting a work area for the processor. RAM is an abbreviation for random access memory.

The DP control unit 120 is coupled to the non-volatile storage unit 130, the operation unit 140, the connection unit 145, and the sound processing unit 147. The non-volatile storage unit 130 is a ROM configured to store programs executed by the DP control unit 120 and data in a non-volatile manner. ROM is an abbreviation for read-only memory.

The sensor control unit 122 operates each sensor included in the image display unit 20. Here, "each sensor" refers to the DP outer camera 61, the distance sensor 64, the DP illuminance sensor 65, the temperature sensor 217, the DP six-axis sensor 235, the DP magnetic sensor 237, and the temperature sensor 239. "Each sensor" includes at least one or more of the DP outer camera 61, the DP illuminance sensor 65, the DP six-axis sensor 235, and the DP magnetic sensor 237. The sensor control unit 122 sets and initializes a sampling period of each sensor according to the control of the DP control unit 120, and executes energization of each sensor, transmission of control data, acquisition of detected values, and the like in correspondence with the sampling period of each sensor.

The sensor control unit 122 outputs detected data indicating the detected value and the detection result of each sensor to the I/F unit 110 at a preset timing. Here, the imaging data of the DP outer camera 61 is referred to as detected data in the same manner as the detected values and the detection results of the other sensors.

The sensor control unit 122 may include an analog/digital (A/D) converter to convert analog signals into digital data. In this case, the sensor control unit 122 converts analog signals of the detected values and detection results acquired from the sensors of the image display unit 20 into detected data and outputs the detected data. The sensor control unit 122 may acquire the digital data of the detected values and the detection results from the sensors of the image display unit 20, convert the data formats, adjust the output timing, and the like, and output the detected data to the I/F unit 110.

By the operation of the sensor control unit 122, the control device 300 coupled to the I/F unit 110 can acquire the detected value of each sensor of the HMD 100, and the imaging data of the DP outer camera 61.

The sensor control unit 122 may be configured to output results obtained by an arithmetic operation based on the detected value of each sensor described above as the detected data. For example, the sensor control unit 122 may be configured to integrally process the detected values and the detection results of the plurality of sensors, and function as a so-called sensor fusion processing unit. In this case, the sensor control unit 122 may generate detected data for a virtual sensor not included in the sensors of the image display unit 20 by sensor fusion. For example, the sensor control unit 122 may output, as detected data, trajectory data indicating a trajectory in which the image display unit 20 moved, coordinate data indicating a position of the image display unit 20 in a three-dimensional space, and directional data indicating a direction of the image display unit 20. Here, the coordinate data may be data indicating relative coordinates based on the position of the connection device 10, or may be data indicating a position relative to a reference position set in the space in which the image display unit 20 is present. The direction data may be data indicating a direction based on the position and the direction of the connection device 10, or may be data indicating a direction relative to a reference position set in the space in which the image display unit 20 is present.

The sensor control unit 122 executes a communication protocol with the device coupled to the connector 11D by the USB cable 46, and outputs the detected data.

The display control unit 124 executes various kinds of processing for the image display unit 20 to display an image on the basis of image data or display data input to the I/F unit 110. In this exemplary embodiment, the image data is transmitted through the connector 11D constituted by the USB Type-C connector in the alternate mode of the USB Type-C. For example, the display control unit 122 is configured to execute various kinds of processing such as frame cutout, resolution conversion, scaling, intermediate frame generation, and frame rate conversion. The display control unit 124 outputs image data corresponding to the OLED units 221, 241 to the connection unit 145. The image data input to the connection unit 145 is transmitted from the connector 11A to the right I/F unit 211 and the left I/F unit 231 as an image signal 201. The display control unit 124 adjusts and changes a display state of the image display unit 20 in accordance with display control data input to the I/F unit 110.

At least one of the sensor control unit 122 and the display control unit 124 may be realized by cooperation of software and hardware by a processor executing a program. That is, the sensor control unit 122 and the display control unit 124 are configured by a processor to execute a program to execute the operations described above. In this example, the sensor control unit 122 and the display control unit 124 may be realized by a processor constituting the DP control unit 120 executing a program. In other words, the processor may function as the DP control unit 120, the display control unit 124, and the sensor control unit 122 by executing the program. Here, the processor can be paraphrased as a computer. Each of the sensor control unit 122 and the display control unit 124 may include a work memory for executing data processing, and may execute processing by utilizing the memory of the DP control unit 120.

The display control unit 124 and the sensor control unit 122 may include programmed hardware such as DSP and FPGA. Further, the sensor control unit 122 and the display control unit 124 may be integrated to be configured as an SoC-FPGA. DSP is an abbreviated expression for digital signal processor. FPGA is an abbreviated expression for field programmable gate array. SoC is an abbreviated expression for system-on-a-chip.

The power control unit 126 is a circuit that is coupled to the connector 11D and, on the basis of power supplied from the connector 11D, supplies power to each component of the connection device 10 and to the image display unit 20.

The operation unit 140 detects an operation of a switch or the like of the connection device 10, and outputs data indicating an operation content to the DP control unit 120.

The sound processing unit 147 generates a sound signal according to sound data input from the DP control unit 120, and outputs the sound signal to the connection unit 145. This sound signal is output from the connection unit 145 to the right earphone 32 and the left earphone 34 via the audio connector 36. The sound processing unit 147 generates sound data of the sound collected by the microphone 63, and outputs the sound data to the DP control unit 120. The sound data output by the sound processing unit 147 may be processed by the sensor control unit 122 in the same manner as the detected data of the sensors included in the image display unit 20.

4. Configuration of Control Device

Figure 4:
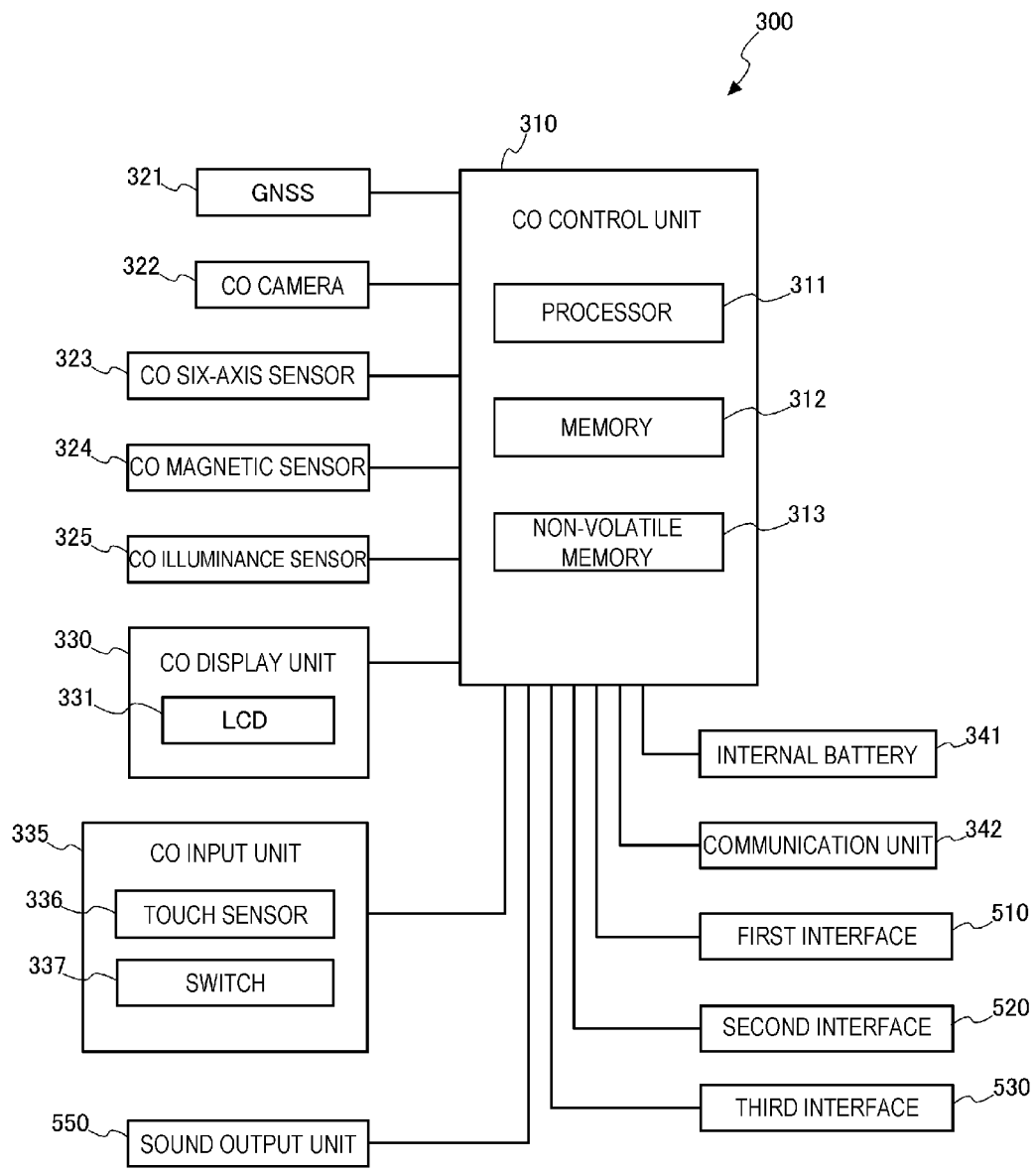
FIG. 4 is a block diagram of a control device.

FIG. 4 is a block diagram of the control device 300.

The control device 300 includes a CO control unit 310. The CO control unit 310 includes a processor 311, a memory 312, and a non-volatile memory 313. The processor 311 includes a CPU, a microcomputer, a DSP, and the like, and is configured to execute a program to control each component of the control device 300. The memory 312 forms a work area of the processor 311. The non-volatile memory 313 is constituted by a semiconductor memory device or the like, and stores programs executed by the processor 311 and various data processed by the processor 311. For example, the non-volatile memory 313 stores an operating system as a basic control program to be executed by the processor 311, an application program operating on the operating system, and the like. The non-volatile memory 313 stores data processed during execution of the application program and data of processing results. Further, the CO control unit 310 may be an SoC integrating the processor 311, the memory 312, and the non-volatile memory 313.

A GNSS 321, a CO camera 322, a CO six-axis sensor 323, a CO magnetic sensor 324, a CO illuminance sensor 325, a CO display unit 330, a CO input unit 335, a sound output unit 550, an internal battery 341, a communication unit 342, a first interface 510, a second interface 520, and a third interface 530 are coupled to the CO control unit 310.

The GNSS 321 utilizes a satellite positioning system to perform positioning, and outputs the position of the control device 300 to the CO control unit 310. GNSS is an abbreviated expression for global navigation satellite system.

The CO camera 322 is a digital camera provided to the main body of the control device 300, is disposed adjacent to the touch panel 350, for example, and captures an image in a direction facing the touch panel 350. The CO camera 322 is configured to capture an image in accordance with the control of the control unit 150, and outputs imaging data to the CO control unit 310. The CO camera 322 corresponds to an example of an imaging unit of the present disclosure.

The CO six-axis sensor 323 is a motion sensor including a three-axis acceleration sensor and a three-axis gyro sensor, and outputs detected data indicating detected values to the CO control unit 310. The CO magnetic sensor 324 is a three-axis geomagnetic sensor, for example, and outputs detected data indicating detected values to the CO control unit 310. The CO six-axis sensor 323 and the CO magnetic sensor 324 may be IMUs in which each of the sensors described above is modularized, or may be a module in which the CO six-axis sensor 323 and the CO magnetic sensor 324 are integrated.

The CO illuminance sensor 325 receives the outside light and outputs detected data indicating detected values corresponding to an amount of the received light or an intensity of the received light to the CO control unit 310.

The CO display unit 330 includes the LCD 331 and displays characters and images on the LCD 331 in accordance with the control of the CO control unit 310.

The CO input unit 335 detects operations made on the touch sensor 336 and with a switch 337, and outputs operation data indicating the detected operations to the CO control unit 310. The touch sensor 336 is disposed overlapping a front surface of the LCD 331 and constitutes the touch panel 350 along with the LCD 331. The touch sensor 336 detects contact operations and pressing operations by the user U. The switch 337 is a hardware switch such as, for example, a power switch 660 of the control device 300 or a volume adjustment switch.

The sound output unit 550 includes a speaker, and outputs sound from the speaker in accordance with the control of the CO control unit 310. The sound output unit 550 may include an amplifier that amplifies the sound signal output by the CO control unit 310 and outputs the amplified sound signal to the speaker. In a case in which the CO control unit 310 is configured to output digital sound data, the sound output unit 550 may include a D/A converter that converts digital sound data to an analog sound signal.

The internal battery 341, the communication unit 342, the first interface 510, the second interface 520, and the third interface 530 are coupled to the CO control unit 310.

The internal battery 341 is a secondary battery built into the main body of the control device 300, and supplies power to each component of the control device 300. The internal battery 341 may include a control circuit (not illustrated) configured to control the output of power and the charging of the secondary battery.

The communication unit 342 supports a wireless communication protocol such as Bluetooth or Wi-Fi, and performs wireless communication with a device external to the display system 1. Bluetooth and Wi-Fi are each a trade name. The communication unit 342 may be configured to utilize a mobile body communication network such as LTE or a fifth generation mobile body communication system to execute mobile data communication. LTE is a trade name.

The control device 300 includes a plurality of interfaces. The control device 300 according to this exemplary embodiment includes the three interfaces of the first interface 510, the second interface 520, and the third interface 530.

The first interface 510 is an interface that conforms to the USB Type-C standard. The first interface 510 is an interface that supports the transmission and reception of data signals, the supply of power to a coupled external device, and the reception of power supplied from the outside. External devices capable of being coupled to the first interface 510 include the HMD 100 and a mobile battery 710, for example. Further, it is also possible to couple an input device such as a digital camera, a QR code reader, a secure digital (SD) card, a mouse, or a keyboard to the first interface 510. QR code is a trade name.

The first interface 510 includes a USB port 511 and a detection circuit 513. The USB port 511 is provided with a terminal for signal transmission, a terminal for signal reception, a terminal that supports USB 2.0 such as D+ or D−, a VBUS terminal, a GND terminal, a CC terminal, and the like. The USB port 511 corresponds to a first port of the present disclosure.

The first interface 510 supports an alternate mode. The alternate mode is a mode in which a USB 3.1 Gen 1 compatible data signal line can be operated as a signal line of another standard. Assume that the HMD 100 is coupled to the USB port 511 of the first interface 510 and the CO control unit 310 outputs an image signal to the HMD 100. In this case, the CO control unit 310 causes the signal line used to transmit and receive data signals to operate as a signal line of DisplayPort, and causes the terminals provided to the USB port 511 of the first interface 510 to operate in a DisplayPort alternate mode. Thus, the image signal is output to the HMD 100, which is an external device coupled to the first interface 510.

The detection circuit 513 detects a change in the voltage of the CC terminal provided to the USB port 511. The detection circuit 513 detects the coupling of the external device to the USB port 511 on the basis of the detected change in voltage of the CC terminal. Further, the detection circuit 513 also determines whether the setting of the external device coupled to the USB port 511 is source or sink on the basis of the detected voltage of the CC terminal. The term "source" refers to a supply source of power, and the term "sink" refers to a consuming side that consumes power. CC is an abbreviation for configuration channel, and the CC terminal includes a plurality of terminals of CC1 and CC2. The detection circuit 513 outputs a signal indicating the detection result to the CO control unit 310.

The second interface 520 is an interface to which an optional battery 730 can be coupled as an external device. The second interface 520 includes a port 521 and a detection circuit 523. The second interface 520 is an interface for charging, and is an interface capable of communicating with a device coupled to the second interface 520. The port 521 is a port corresponding to a second port of the present disclosure, and this port 521 is provided with contact terminals 525. The contact terminal 525 is a terminal that comes into contact with a pad 750 having metal properties and provided to the optional battery 730 described later, and receives power supplied from the optional battery 730. A pogo pin, for example, is used as the contact terminal 525. The pogo pin has a spring characteristic and expands and contracts when in contact with the pad 750 of the optional battery 730. The signal lines of VBus, D+, D−, and Grand of USB 2.0 are respectively coupled to the contact terminals 525. Further, the contact terminals 525 include a terminal used for coupling detection of an external device, and the detection circuit 523 detects the coupling of an external device to the second interface 520 by a change in voltage of this terminal. The detection circuit 523 outputs a signal indicating the detection result to the CO control unit 310.

The third interface 530 is also an interface that conforms to the USB Type-C standard. The third interface 530 is an interface that supports the transmission and reception of data signals, the supply of power to the outside, and the reception of power supplied from the outside. Further, the third interface 530 does not support an alternate mode.

The third interface 530 can couple the mobile battery 710 as an external device. Further, it is also possible to couple an input device such as a digital camera, a QR code reader, an SD card, a mouse, or a keyboard to the third interface 530.

The third interface 530 includes a USB port 531 and a detection circuit 533. The USB port 531 corresponds to a third port of the present disclosure. The detection circuit 533 detects a change in voltage of the CC terminal provided to the USB port 531. The detection circuit 533 detects the coupling of an external device to the USB port 531 by a detected change in voltage of the CC terminal. The detection circuit 533 outputs a signal indicating the detection result to the CO control unit 310.

Figure 5:
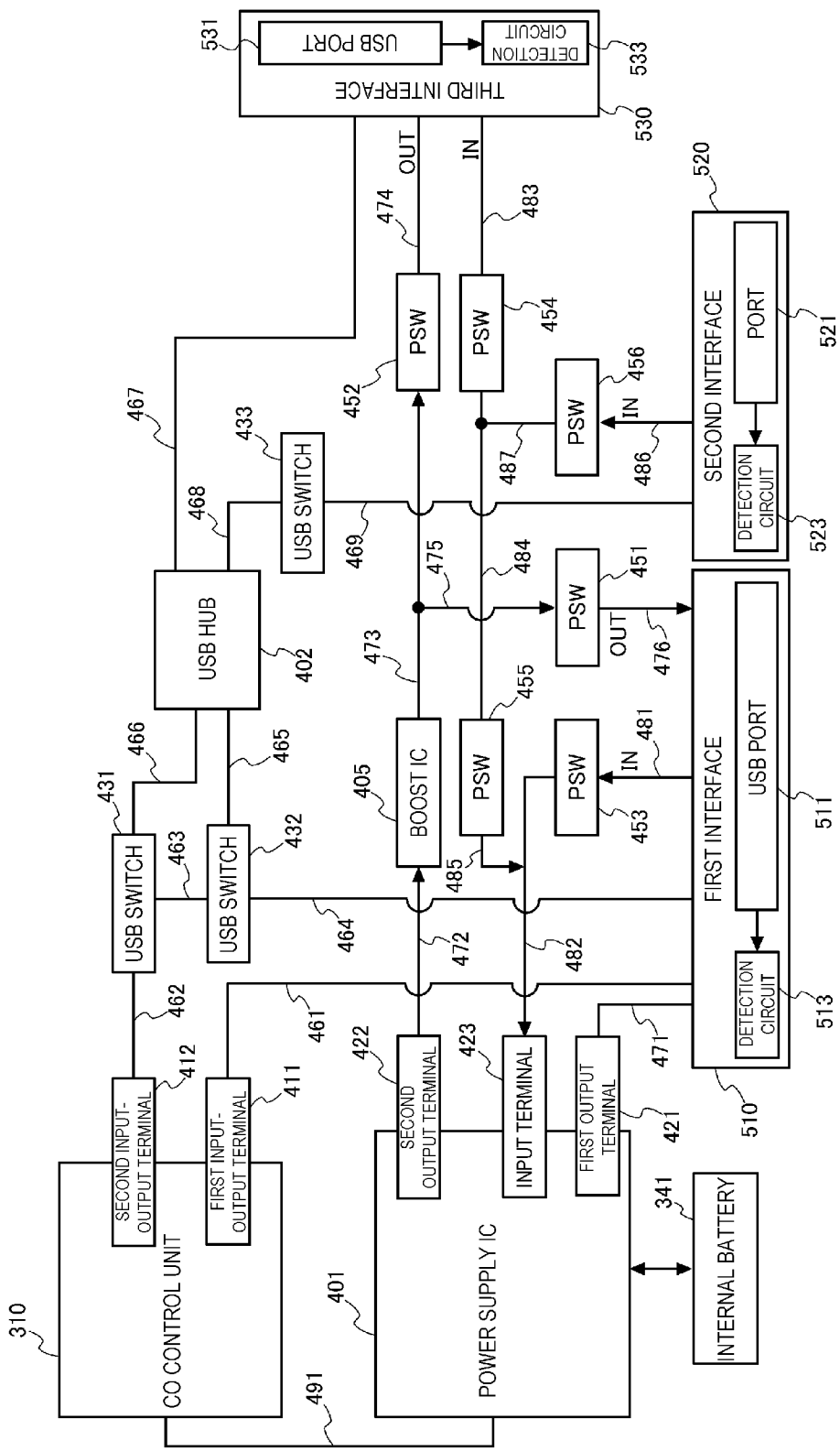
FIG. 5 is a drawing illustrating a coupling example between a CO control unit, a power supply IC, and each interface.

FIG. 5 is a diagram illustrating a coupling example between the CO control unit 310 and a power supply integrated circuit (IC) 401 of the control device 300 and each of the interfaces.

The CO control unit 310, the first interface 510, the second interface 520, and the third interface 530 are respectively coupled by data lines that perform data communication.

The CO control unit 310 and the first interface 510 are coupled by a data line 461. The CO control unit 310 includes a first input-output terminal 411. A differential signal line for transmitting and receiving serial data supporting USB SuperSpeed mode is coupled to the first input-output terminal 411. Further, this first input-output terminal 411 supports DisplayPort alternate mode and is utilized as the terminal to which the image signal is output.

Further, the CO control unit 310 and the first interface 510 are coupled via a USB switch 431 and a USB switch 432. The CO control unit 310 includes a second input-output terminal 412. A signal line that conforms to the USB 2.0 standard is coupled to the second input-output terminal 412. The second input-output terminal 412 and the USB switch 431 are coupled by a data line 462. The USB switch 431 and the USB switch 432 are coupled by a data line 463. The USB switch 432 and the USB port 511 are coupled by a data line 464.

The CO control unit 310 and the third interface 530 are coupled via the USB switch 431 and a USB hub 402.

The second input-output terminal 412 and the USB switch 431 are coupled by the data line 462. The USB switch 431 and the USB hub 402 are coupled by a data line 466. The USB hub 402 and the third interface 530 are coupled by a data line 467.

Further, the CO control unit 310 and the second interface 520 are coupled via the USB switch 431, the USB hub 402, and a USB switch 433.

The second input-output terminal 412 and the USB switch 431 are coupled by the data line 462. The USB switch 431 and the USB hub 402 are coupled by the data line 466. The USB hub 402 and the USB switch 433 are coupled by a data line 468. Further, the USB switch 433 and the second interface 520 are coupled by a data line 469.

Next, the coupling between the power supply IC 401 and the first interface 510, the second interface 520, and the third interface 530 will be described.

The power supply IC 401 is coupled to the internal battery 341 and controls the charging of the internal battery 341 and the supply of power charged to the internal battery 341. The power supply IC 401 is coupled to the CO control unit 310 via a power supply line 491, and supplies a system power supply for operating the CO control unit 310 to the CO control unit 310.

Further, the power supply IC 401 includes a first output terminal 421 and a second output terminal 422 as terminals for outputting power to the outside, and includes an input terminal 423 as a terminal for receiving power supplied from the outside.

The first output terminal 421 complies with the USB PD standard and is coupled to the first interface 510 by a power supply line 471. PD is an abbreviation for power delivery.

The second output terminal 422 is coupled to the first interface 510 and the third interface 530.

The second output terminal 422 and the first interface 510 are coupled via a boost IC 405 and a PSW 451. The boost IC 405 is a circuit for boosting the voltage supplied from the power supply IC 401. PSW is an abbreviation for power switch.

The second output terminal 422 and the boost IC 405 are coupled by a power supply line 472. The boost IC 405 and the PSW 451 are coupled by a power supply line 473 and a power supply line 475 coupled to the power supply line 473. The PSW 451 and the first interface 510 are coupled by a power supply line 476.

The second output terminal 422 and the third interface 530 are coupled via the boost IC 405 and a PSW 452.

The second output terminal 422 and the boost IC 405 are coupled by the power supply line 472. The boost IC 405 and the PSW 452 are coupled by the power supply line 473. The PSW 452 and the third interface 530 are coupled by a power supply line 474.

The input terminal 423 is coupled to the first interface 510, the second interface 520, and the third interface 530.

The first interface 510 and the input terminal 423 are coupled via a PSW 453. The first interface 510 and the PSW 453 are coupled by a power supply line 481. The PSW 453 and the input terminal 423 are coupled by a power supply line 482.

The third interface 530 and the input terminal 423 are coupled via a PSW 454 and a PSW 455. The third interface 530 and the PSW 454 are coupled by a power supply line 483. The PSW 454 and the PSW 455 are coupled by a power supply line 484. The PSW 455 and the input terminal 423 are coupled by a power supply line 485 and the power supply line 482.

The second interface 520 and the input terminal 423 are coupled via a PSW 456 and the PSW 455. The second interface 520 and the PSW 456 are coupled by a power supply line 486. The PSW 456 and the PSW 455 are coupled by the power supply lines 487, 484. The PSW 455 and the input terminal 423 are coupled by the power supply line 485 and the power supply line 482.

The detection results of the detection circuits 513, 523, 533 are input to the CO control unit 310. The CO control unit 310 controls the USB switches 431 to 433 and the PSWs 451 to 456 on the basis of the input detection results to switch an output destination of a data signal, a supply destination for supplying power, a power reception destination for receiving power, and the like.

Figure 6:
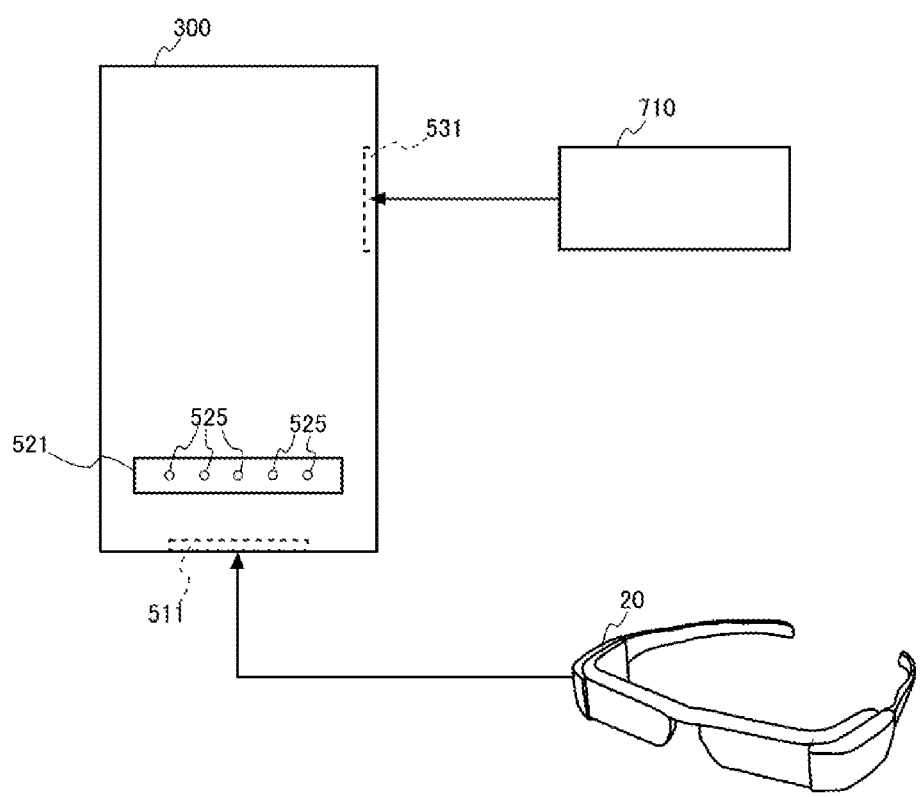
FIG. 6 is a drawing illustrating a coupling example between the control device and an external device.

FIG. 6 is a drawing illustrating a coupling example between the control device 300 and an external device.

FIG. 6 illustrates a case in which the HMD 100 is coupled to the USB port 511 and the mobile battery 710 is coupled to USB port 531.

The first interface 510 is operated in an alternate mode, making it possible to output the image signal from the control device 300 to the HMD 100, and display an image based on the image signal on the image display unit 20 of the HMD 100. The CO control unit 310 outputs the image signal to the first interface 510 via the first input-output terminal 411.

Further, with the mobile battery 710 coupled to the third USB port 531, the internal battery 341 can be charged by power supplied from the mobile battery 710. In a case in which the setting of the HMD 100 coupled to the USB port 511 is sink, the CO control unit 310 switches the PSWs so that the power supplied from the mobile battery 710 coupled to the USB port 531 is received. The CO control unit 310 sets the PSWs 454, 455 to on and sets the PSWs 453, 456 to off.

Priority levels are set for the first interface 510, the second interface 520, and the third interface 530. This priority level is a priority level for charging the power supplied to the control device 300. The priority level of the first interface 510 is set higher than the priority levels of the second interface 520 and the third interface 530.

Figure 7:
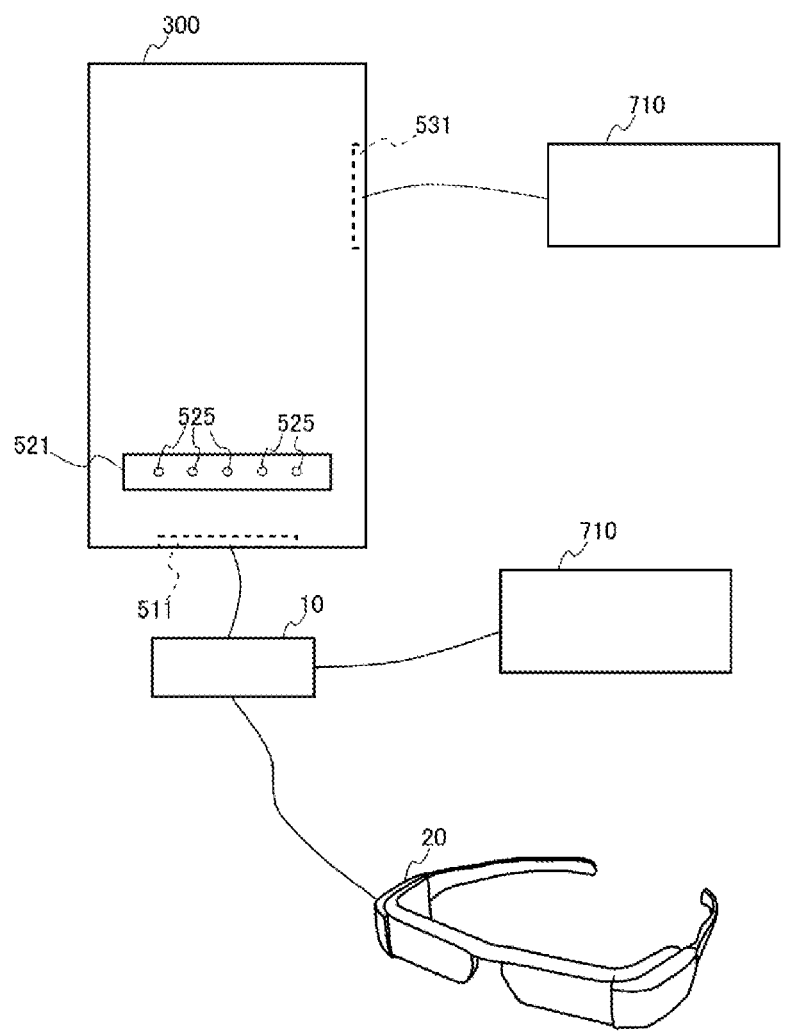
FIG. 7 is a drawing illustrating a coupling example between the control device and the external device.

For example, as illustrated in FIG. 7, assume that the HMD 100 and the mobile battery 710 are coupled to the connection device 10 coupled to the USB port 511 of the first interface 510. Further, assume that the mobile battery 710 is coupled to the USB port 531 of the third interface 530 as well. In a case in which the mobile battery 710 is also operable as a source, the CO control unit 310 selects the mobile battery 710 coupled to the connection device 10 and charges the internal battery 341 by the power supplied from the selected mobile battery 710. In this case, the CO control unit 310 sets the PSW 453 to on and sets the PSWs 454 to 456 to off.

Figure 8:
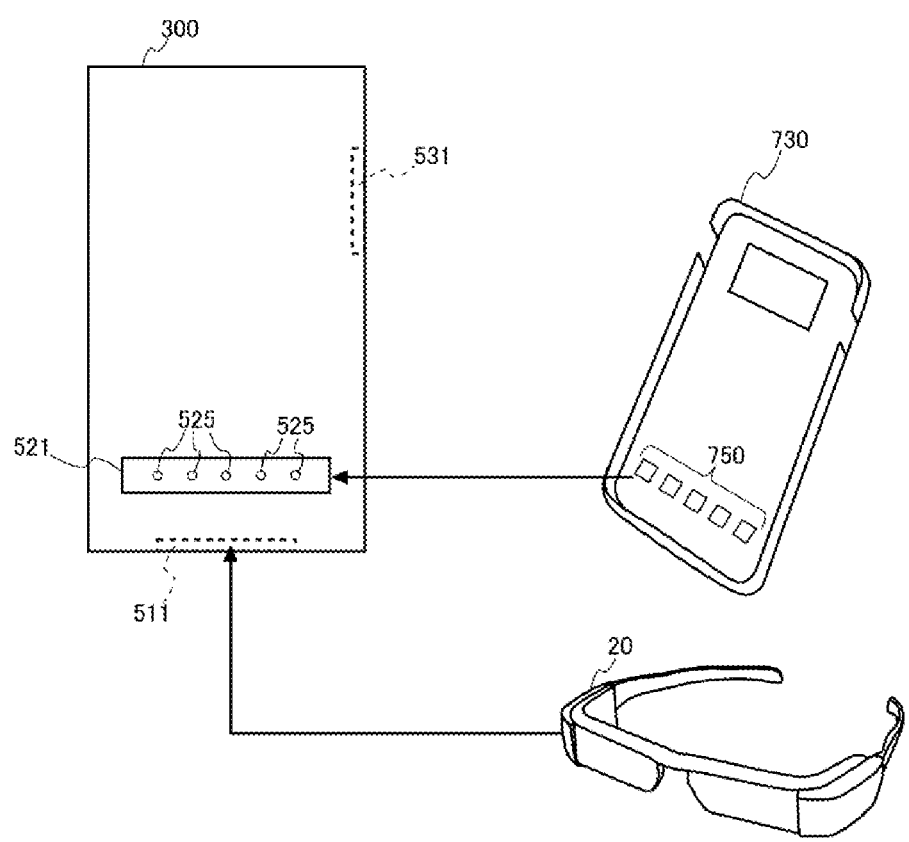
FIG. 8 is a drawing illustrating a coupling example between the control device and the external device.

FIG. 8 is a drawing illustrating a coupling example between the control device 300 and an external device.

FIG. 8 illustrates a case in which the HMD 100 is coupled to the USB port 511, and the optional battery 730, which is a battery optionally prepared, is coupled to the contact terminal 525 of the second interface 520. In this case as well, similar to the coupling example illustrated in FIG. 6, an image signal is output from the control device 300 to the HMD 100, and an image based on the image signal is displayed on the image display unit 20 of the HMD 100. The optional battery 730, when coupled to the control device 300, is included in the control device 300. Specifically, when the optional battery 730 is coupled to the control device 300, the control device 300 comes into contact with each of an upper, a lower, a left, and a right side surface and a rear surface of the control device 300. Further, a plurality of the pads 750 are disposed at contact positions that come into contact with the contact terminals 525 provided to the rear surface of the control device 300. The contact terminals 525 are each constituted by a pogo pin, and expand and contract when brought into contact with the pad 750. With the contact terminal 525 expanding and contracting, a reliability of contact between the contact terminal 525 and the pad 750 can be increased.

In the case of the coupling example illustrated in FIG. 8 as well, in a case in which the setting of the HMD 100 coupled to the USB port 511 is sink, the CO control unit 310 switches the PSWs so that the power supplied from the optional battery 730 coupled to the connection terminal 525 of the second interface 520 is received. The CO control unit 310 sets the PSW 456 to on and sets the PSWs 453 to 455 to off.

Figure 9:
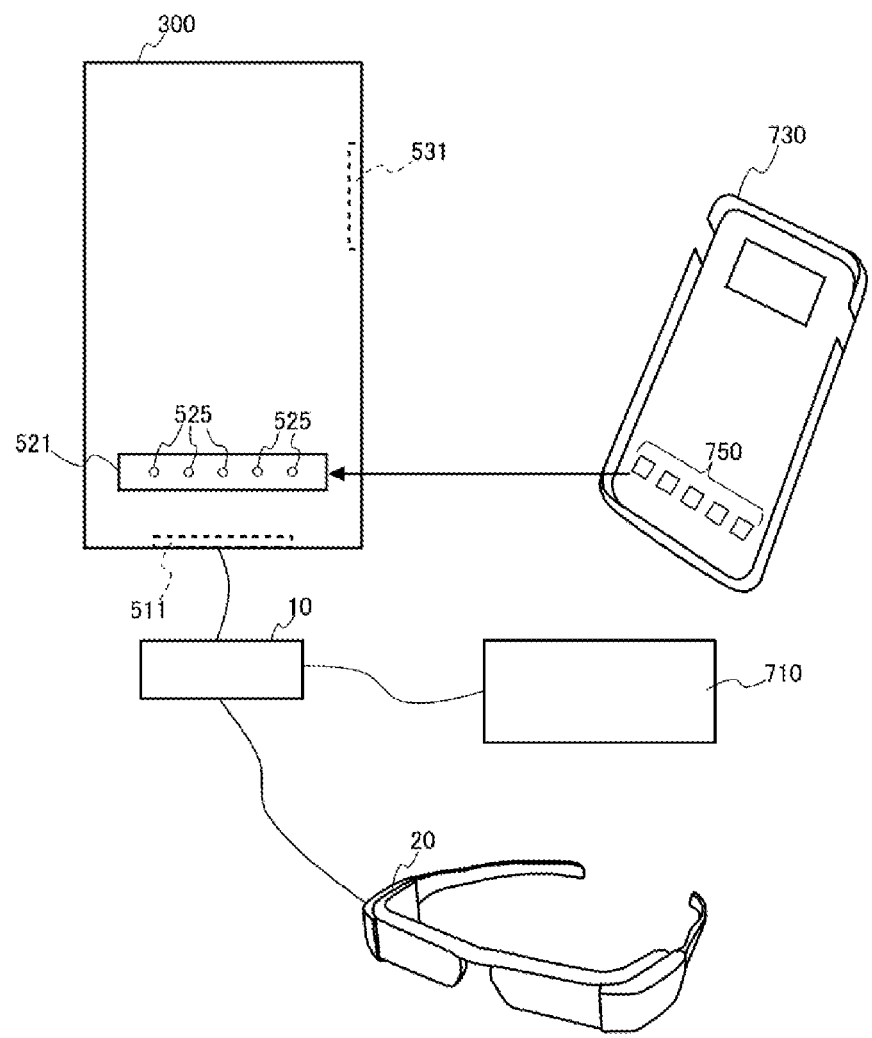
FIG. 9 is a drawing illustrating a coupling example between the control device and the external device.

Further, as illustrated in FIG. 9, assume that the HMD 100 and the mobile battery 710 are coupled to the connection device 10 coupled to the USB port 511 of the first interface 510. Further, assume that the optional battery 730 is coupled to the port 521 of the second interface 520. Among the first interface 510 and the second interface 520, the priority level of the first interface 510 is higher than that of the second interface 520. In this case, the CO control unit 310 selects the mobile battery 710 coupled to the connection device 10 and charges the internal battery 341 by the power supplied from the selected mobile battery 710. The CO control unit 310 sets the PSW 453 to on and sets the PSWs 454 to 456 to off.

Figure 10:
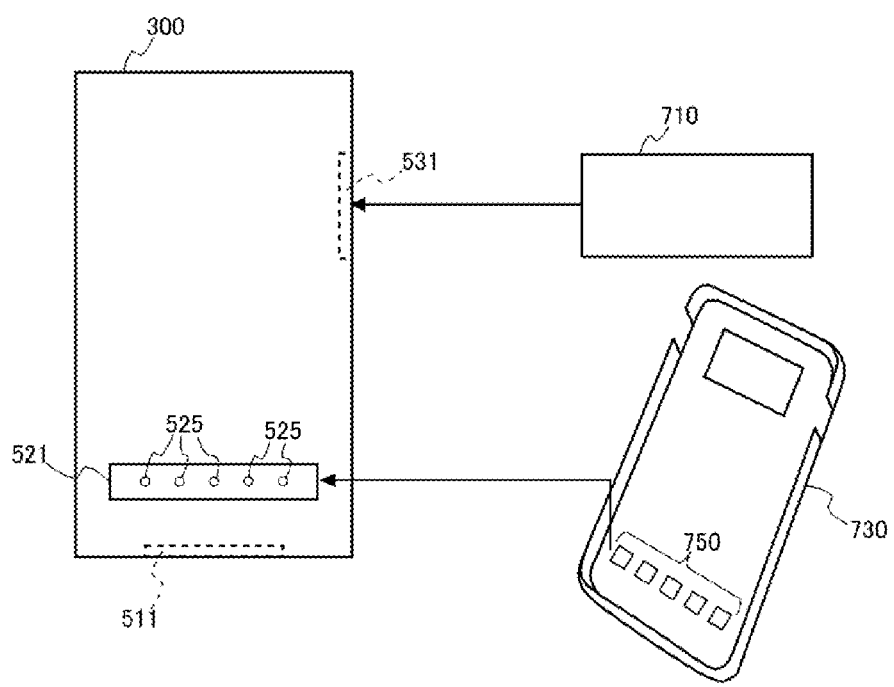
FIG. 10 is a drawing illustrating a coupling example between the control device and the external device.

FIG. 10 is a drawing illustrating a coupling example between the control device 300 and an external device.

FIG. 10 illustrates a case in which the mobile battery 710 is coupled to the second USB port 525 and the optional battery 730 is coupled to the second interface 520.

In this exemplary embodiment, the priority level of the third interface 530 is higher than the priority level of the second interface 520. In a case in which the source is coupled to the third interface 530 and the second interface 520, the CO control unit 310 switches the PSWs so that the power supplied from the mobile battery 710 coupled to the USB port 531 is received. The CO control unit 310 sets the PSWs 454, 455 to on and sets the PSWs 453, 456 to off.

Note that, in a state in which the optional battery 730 is coupled to the port 521 of the second interface 520, a restriction may be provided so that the mobile battery 710 cannot be coupled to the USB port 531 of the third interface 530. For example, when the optional battery 730 is coupled to the control device 300, the USB port 531 may be physically hidden by this optional battery 730, not allowing an external device to be coupled to the USB port 531. Accordingly, the port 521 of the second interface 520 and the USB port 531 of the third interface 530 can be prevented from simultaneously being coupled to a battery. Further, by concealing the USB port 531 by the optional battery 730, it is possible to suppress the entry of dust and the like into the USB port 531.

Figure 11:
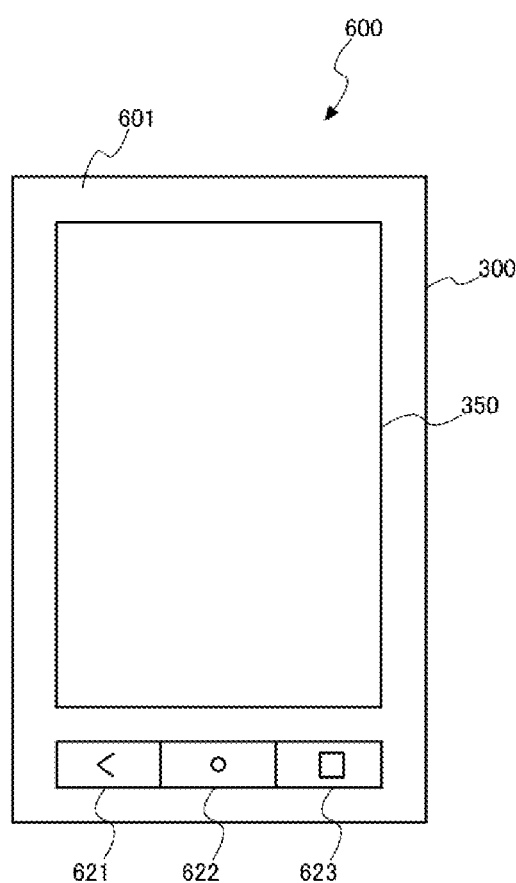
FIG. 11 is a front view of the control device.

FIG. 11 is a front view of the control device 300.

The main body of the control device 300 is accommodated within a housing 600. The main body of the control device 300 includes each component illustrated in FIG. 4. The surface of the housing 600 on which the touch panel 350 is disposed is referred to as a front surface 601. The front surface 601 corresponds to a first surface of the present disclosure. The front surface 601 is provided with the three buttons of a first button 621, a second button 622, and a third button 623. The first button 621, the second button 622, and the third button 623 are configured with functions for displaying a home screen, returning to an original screen, displaying a plurality of application screens, or the like, for example.

Figure 12:
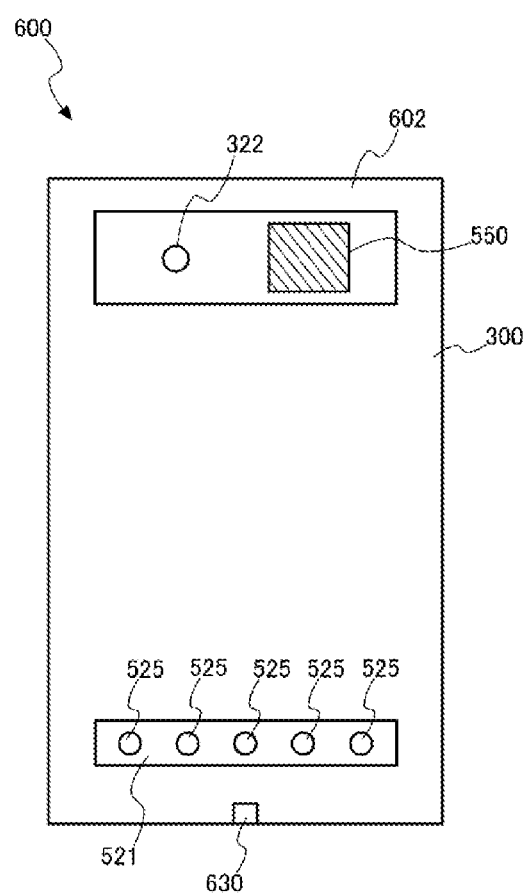
FIG. 12 is a rear view of the control device.

FIG. 12 is a rear view of the control device 300.

The CO camera 322 and the sound output unit 550 are disposed on a rear surface 602 of the housing 600, the rear surface 602 being a surface opposite the front surface 601. Further, as a port arrangement, the rear surface 602 is provided with the port 521 of the second interface 520. The rear surface 602 corresponds to a second surface of the present disclosure.

The CO camera 322 and the sound output unit 550 are disposed in positions away from the contact terminals 525 in the longitudinal direction of the rear surface 602 of the housing 600. The CO camera 322 and the sound output unit 550 are disposed on an end portion in the longitudinal direction of the rear surface 602, the end portion being on an upper end portion side away from a bottom surface 606 where the USB port 511 is disposed. Further, the contact terminals 525 provided to the port 521 are disposed on an end portion in the longitudinal direction of the rear surface 602, the end portion being on a lower end portion closer to the bottom surface 606 where the USB port 511 is disposed.

Further, a strap fixing portion 630 that couples a strap used when the control device 300 is carried is provided to a lower end in the longitudinal direction of the rear surface 602, at a center in the lateral direction of the rear surface 602. As illustrated in FIG. 12 and FIG. 14, in this exemplary embodiment, a hole that penetrates from the rear surface 602 to the bottom surface 606 is provided in the housing of the control device 300, and a ring provided to a strap leading end is passed through and fixed to this hole. While, in this exemplary embodiment, an example is illustrated in which the strap fixing portion 630 is provided to the lower end in the longitudinal direction of the rear surface 602, the strap fixing portion 630 may be provided to the bottom surface 606, which is the surface provided with the USB port 511 of the first interface 510.

Figures 13A, 13B:
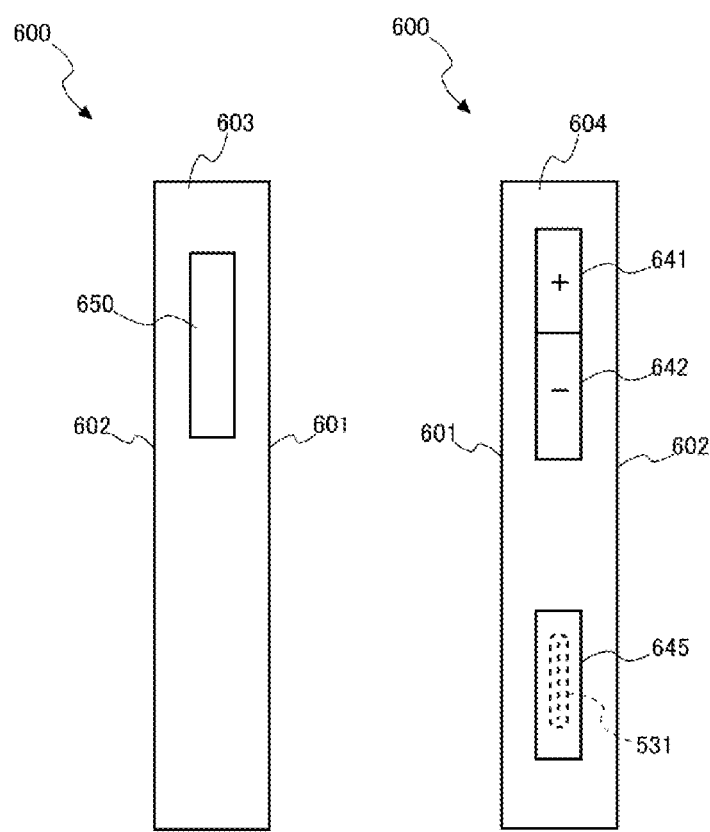
FIGS. 13A and 13B are a left side view and a right side view of the control device.

FIGS. 13A and 13B are side views of the control device 300. FIG. 13A illustrates a left side view of the control device 300 and FIG. 13B illustrates a right side view of the control device 300. A left side surface 603 and a right side surface 604 are side surfaces on lateral sides of the front surface 601, which is the first surface. A trigger button 650 is provided to the left side surface 603 of the housing 600. The trigger button 650 is a button that, by another button such as the first button 621, the second button 622, or the third button 623 being pressed while the trigger button 650 is pressed, allows selection of a function other than the function configured for that button.

A volume up button 641 and a volume down button 642 for adjusting the sound output are provided to the right side surface 604 of the housing 600. Further, as the port arrangement, the USB port 531 of the third interface 530 is provided to the right side surface 604. The USB port 531 is disposed on a bottom end portion side, which is the end portion closer to the bottom surface 606 provided with USB port 511. Further, the USB port 531 is covered by a cover 645 to increase a water resistance of the control device 300. The right side surface 604 corresponds to a third surface of the present disclosure and corresponds to a side surface in the lateral direction of the housing 600. Further, the USB port 531 may be provided to the left side surface 603 of the housing 600.

Figure 14A:
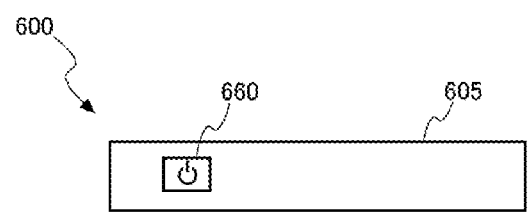
FIGS. 14A and 14B are a plan view and a bottom view of the control device.
Figure 14B:
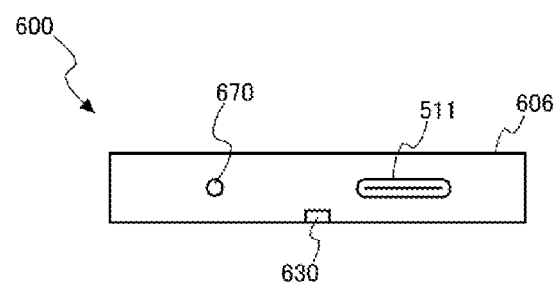

FIGS. 14A and 14B are a plan view and a bottom view of the control device 300. FIG. 14A illustrates the plan view of the control device 300 and FIG. 14B illustrates the bottom view of the control device 300.

The power switch 660 is disposed on a top surface 605 of the housing 600. Further, as the port arrangement, the USB port 511 of the first interface 510 is disposed on the bottom surface 606 of the housing 600. Furthermore, an earphone jack 670 is disposed on the bottom surface 606. The top surface 605 and the bottom surface 606 are side surfaces positioned in the longitudinal direction of the front surface 601. While FIG. 12 illustrates a case in which the USB port 511 is provided to the bottom surface 606 of the housing 600, the USB port 511 may be provided to the top surface 605 of the housing 600.

Figure 15:
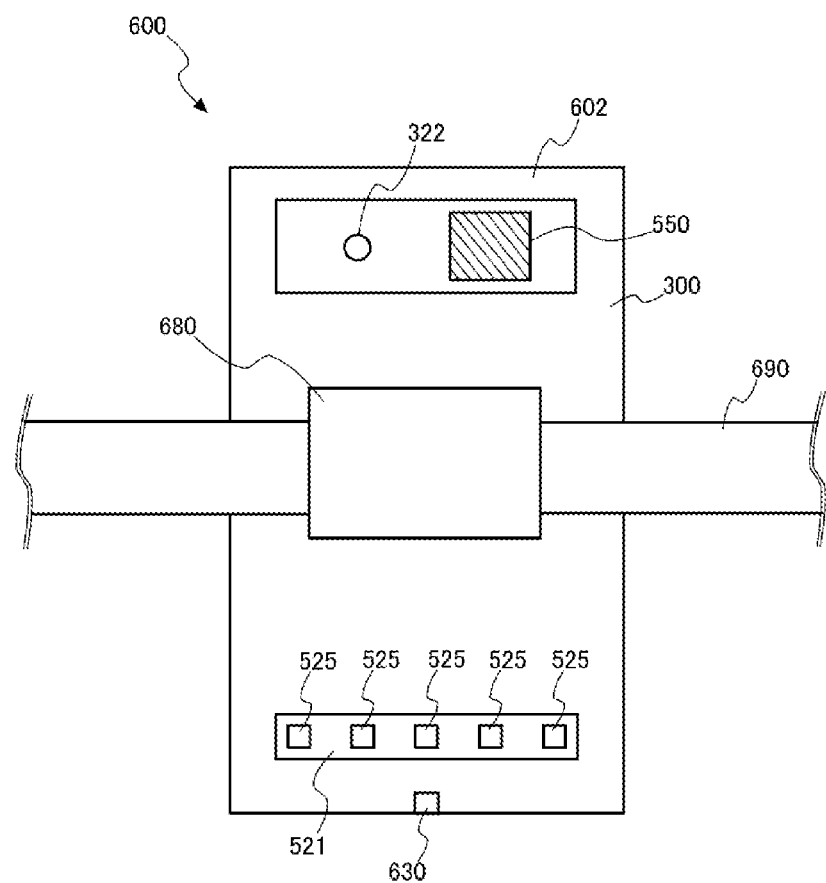
FIG. 15 is a drawing illustrating the control device provided with a band holding portion.

FIG. 15 is a drawing illustrating the control device 300 provided with a band holding portion 680.

The band holding portion 680 is provided to the rear surface 602 of the housing 600. The band holding portion 680 illustrated in FIG. 15 is disposed substantially at the center of the rear surface 602. The band holding portion 680 is fixed to the rear surface 602 at both end portions in the longitudinal direction of the rear surface 602. Further, both end portions in the lateral direction of the rear surface 602 are not fixed to the rear surface 602, making it possible to pass a band 690 between the rear surface 602 and the band holding portion 680. The band 690 held in the band holding portion 680 is wrapped around an arm or the like of the user, thereby fixing the control device 300 to a body such as the arm of the user.

As described above, the control device 300 of this exemplary embodiment is a device that displays an image on the touch panel 350.

The control device 300 includes the USB port 511 of the first interface 510 capable of transmitting an image signal serving as the basis of an image and capable of receiving power, and the port 521 of the second interface 520 capable of receiving power. The main body of the control device 300 is accommodated in the housing 600. The USB port 511 of the first interface 510 is disposed on the bottom surface 606 which, given that the surface of the housing 600 on which the touch panel 350 is disposed is the front surface 601, is a side surface of the housing 600, positioned in the longitudinal direction of the front surface 601. The port 521 of the second interface 520 is disposed on the rear surface 602 opposite the front surface 61, on an end portion in the longitudinal direction of the rear surface 602.

Accordingly, in a case in which the user U holds the housing 600 in his or her hand, the USB port 511 and the port 521 can be disposed in non-obstructing positions. Therefore, even in a case in which a plurality of ports are provided to the control device 300, a reduction in usability of the control device 300 can be suppressed.

Further, the control device 300 includes the third interface 530 capable of transmitting and receiving data signals and receiving power. The USB port 531 of the third interface 530 is disposed on a right side surface 604 that is a side surface in the lateral direction of the housing 600, on an end portion closer to the bottom surface 606 provided with the USB port 511.

Therefore, when the user U holds the housing 600 in his or her hand, the USB port 531 can be disposed in a non-obstructing position, and a reduction in usability of the control device 300 can be suppressed.

Further, the control device 300 also includes the CO camera 322.

The CO camera 322 is disposed on an end portion side in the longitudinal direction of the rear surface 602, the end portion being away from the bottom surface 606 where the USB port 511 is disposed.

Therefore, even in a case in which a plurality of ports are disposed in the control device 300, the user U can hold the housing 600 in his or her hand and capture images by the CO camera 322.

Further, the port 521 of the second interface 520 is disposed on the end portion in the longitudinal direction of the rear surface 602, the end portion being closer to the bottom surface 606 where the USB port 511 is disposed.

Accordingly, the USB port 511 and the USB port 531 can be disposed on one end portion side in the longitudinal direction of the housing 600 and, when the user U holds the housing 600 in his or her hand, can be disposed in non-obstructing positions.

Further, the control device 300 includes the strap fixing portion 630 that fixes a strap to the housing 600. The strap fixing portion 630 is disposed on the bottom surface 606 where the USB port 511 is disposed.

Accordingly, when the strap is attached to the control device 300 and the UBS cable is coupled to the USB port 511, the strap and the UBS cable are fixed to the same surface of the housing 600. Therefore, when the housing 600 is held in a hand, it is easier to handle the UBS cable and the strap together and, even in a state in which the USB cable and the strap are coupled to the control device 300, it is possible to suppress a reduction in operability of the control device 300.

Further, the control device 300 includes the band holding portion 680 that holds the band 690 that fixes the control device 300 to the user U. The USB port 511 is disposed at a surface different from the surface of the housing 600 provided with the band holding portion 680.

Accordingly, even when a USB cable is coupled to the USB port 511, the control device 300 can be fixed to the body of the user U by the band 690.

Further, the port 521 of the second interface 520 includes the plurality of contact terminals 525. The plurality of contact terminals 525 are disposed in the lateral direction of the rear surface 602 of the housing 600. Accordingly, when the user U operates the control device 300, the plurality of contact terminals 525 can be disposed at positions that do not hinder operation by the user U.

Further, the plurality of contact terminals 525 each have a spring characteristic and expand and contract when in contact with the pad 750 provided to the optional battery 730 that couples to the second interface 520.

Accordingly, electrical coupling to the optional battery 730 can be reliably achieved.

Further, the first interface 510 conforms to the USB Type-C standard.

The control device 300 constitutes a connector provided at the USB port 511 to operate in the DisplayPort alternate mode.

Accordingly, an image signal can be supplied from the control device 300 to the HMD 100 via the first interface 510.

The present disclosure is not limited to the configurations explained in the exemplary embodiments described above, and the present disclosure can be implemented in various aspects without departing from the gist of the present disclosure.

For example, while the display system 1 illustrates a configuration including the HMD 100, which is a head-mounted display apparatus, the present disclosure is not limited thereto, and various types of display devices can be employed. For example, instead of the image display unit 20, for example, another type of image display unit such as an image display unit to be worn like a cap, for example, may be employed. Such an image display unit may include a display unit configured to display images corresponding to the left eye LE of the user U and a display unit configured to display images corresponding to the right eye RE of the user U. Additionally, the display device in the present disclosure may be configured, for example, as a head-mounted display mounted onto a vehicle such as a car or an airplane. Further, the display device may be configured, for example, as a head-mounted display built into a body protector tool such as a helmet. In such a case, a portion for positioning the head-mounted display relative to the body of the user U, and a portion positioned relative to that portion can be a mounting portion of the head-mounted display.

The HMD 100 is an example of a display device applicable to the present disclosure, and is not limited to the configuration illustrated in FIG. 3. For example, while a configuration in which the image display unit 20 and the connection device 10 are separated has been described as an example in the exemplary embodiment described above, a configuration in which the connection device 10 and the image display unit 20 are integrally configured and mounted onto the head of the user U is also possible. Further, the configuration of the optical system of the image display unit 20 is as desired and, for example, an optical member positioned in front of the eye of the user U and overlapping a portion or all of the field of view of the user U may be used. Alternatively, a scanning type optical system that performs scanning with a laser beam or the like to form imaging light may be adopted. Alternatively, the present disclosure is not limited to guiding the imaging light in the interior of an optical member, and may have only a function of refracting and/or reflecting and guiding the imaging light toward the eye of the user U.

Further, as the display device, a liquid crystal monitor or a liquid crystal television that displays an image on a liquid crystal display panel may be adopted. A display device including a plasma display panel and an organic electroluminescent (EL) display panel may be used. In this case, the display panel corresponds to the display unit of the present disclosure. Further, as the display device, a projector that projects imaging light onto a screen or the like may be used.

Further, for example, in the HMD 100 illustrated in FIG. 3, the connection device 10 may be configured utilizing a USB Type-C connector, a USB Type-C controller, and a USB hub. In this case, the DP outer camera 61 and other sensors may be coupled to the USB hub. Further, as a controller that controls the displays of the right display unit 22 and the left display unit 24 in the image display unit 20, an FPGA that outputs display data to the right display unit 22 and the left display unit 24 may be disposed in the right display unit 22 or the left display unit 24. In this case, the connection device 10 may include a bridge controller that couples the USB Type-C controller and the FPGA. Further, the image display unit 20 may have a configuration in which the DP six-axis sensor 235, the DP magnetic sensor 237, the EEPROM 215, and the like are mounted on the same substrate as the FPGA. The arrangement of the other sensors can also be changed as appropriate. For example, the distance sensor 64 and the DP illuminance sensor 65 may be disposed at positions suitable for measurement or detection, and may be coupled to the FPGA or the USB Type-C controller.

Further, the specific specifications of the display device including the OLED units 221, 241 are also not limited and, for example, the OLED units 221, 241 may have a common configuration.

At least some of the functional blocks illustrated in FIG. 3 and FIG. 4 may be realized in the form of hardware or may be realized by a cooperation of hardware and software, and are not limited to configurations in which independent hardware resources are arranged as illustrated in the drawings. Further, a configuration may be adopted in which programs stored in external devices and executed by the processor 311 are acquired via the communication unit 342 and the I/F unit 343 and executed.

What is claimed is:

1. An image display device configured to display an image on a display surface, the image display device comprising:
   a first port of a first interface configured to transmit an image signal that serves as a basis of an image and receive power; and
   a second port of a second interface configured to receive power, wherein
   the image display device is accommodated in a housing,
   the first port is disposed at a side surface of a first surface of the housing, the display surface being disposed on the first surface, the side surface being positioned in a longitudinal direction of the first surface such that the side surface is perpendicular to a longitudinal direction of the housing, and
   the second port is disposed at an end portion of a second surface of the housing that is opposite to the first surface, the second surface being opposite to the display surface, the end portion being in a longitudinal direction of the second surface such that the end portion is nearby the side surface at which the first port is disposed.

2. The image display device according to claim 1, comprising:
   a third interface configured to transmit and receive a data signal and receive power, wherein
   a third port of the third interface is disposed at an end portion of a third surface that is a side surface in a lateral direction of the first surface, the end portion being one of end portions closer to the side surface where the first port is disposed.

3. The image display device according to claim 1, comprising:
   an imaging unit, wherein
   the imaging unit is disposed at an end portion in the longitudinal direction of the second surface, the end portion being one of end portions farther from the side surface where the first port is disposed.

4. The image display device according to claim 1, wherein
   the second port is disposed at an end portion in the longitudinal direction of the second surface, the end portion being one of end portions closer to the side surface where the first port is disposed.

5. The image display device according to claim 1, comprising:
a strap fixing portion configured to fix a strap to the housing, wherein
the strap fixing portion is disposed at the side surface where the first port is disposed.

6. The image display device according to claim 1, comprising:
a band holding portion configured to hold a band configured to fix the image display device onto a user, wherein
the first port is disposed at a surface different from a surface of the housing provided with the band holding portion.

7. The image display device according to claim 1, wherein
the second port comprises a plurality of contact terminals and
the plurality of contact terminals are disposed in a lateral direction of the second surface.

8. The image display device according to claim 7, wherein
the plurality of contact terminals have a spring characteristic and are configured to expand and contract when brought into contact with a coupling terminal provided to an external device coupled to the second interface.

9. The image display device according to claim 1, wherein the first interface conforms to a USB Type-C standard and the image display device constitutes a connector provided at the first port to operate in a DisplayPort alternate mode.

10. A port arrangement in which:
a first port of a first interface configured to transmit an image signal and configured to receive power is disposed at a second surface that is a side surface of a first surface of a housing accommodating a device main body, the second surface being positioned in a longitudinal direction of the first surface such that the side surface is perpendicular to a longitudinal direction of the housing; and
a second port of a second interface configured to receive power is disposed at an end portion of a third surface that is opposite to the first surface, the end portion being in the longitudinal direction of the third surface such that the end portion is nearby the second surface at which the first port is disposed.

* * * * *